United States Patent [19]

Rudi

[11] Patent Number: 5,323,280
[45] Date of Patent: Jun. 21, 1994

[54] THREE POINT REFERENCE SYSTEM FOR A CARTRIDGE IN A TAPE DRIVE

[75] Inventor: Guttorm Rudi, Fjellhamar, Norway

[73] Assignee: Tandberg Data A/S, Norway

[21] Appl. No.: 836,957

[22] Filed: Feb. 19, 1992

[51] Int. Cl.$^5$ .............................................. G11B 5/008
[52] U.S. Cl. ..................................... 360/96.5; 242/192
[58] Field of Search ................... 360/93, 96.1, 96.5, 360/96.6; 369/77.2; 242/192

[56] References Cited

U.S. PATENT DOCUMENTS

| | | | |
|---|---|---|---|
| Re. 33,224 | 5/1990 | Spiegelstein | 360/93 |
| 3,524,651 | 8/1970 | Ketzer | 360/96.5 |
| 3,689,077 | 9/1972 | Ohira | 360/60 |
| 3,964,098 | 6/1976 | Kramer et al. | 360/93 |
| 4,156,260 | 5/1979 | Joshi | 360/96.1 |
| 4,337,908 | 7/1982 | Sims, Jr. | 242/198 |
| 4,514,775 | 4/1985 | Manning et al. | 360/96.6 |
| 4,608,615 | 8/1986 | Zeavin | 360/96.1 |
| 4,636,890 | 1/1987 | Rudi et al. | 360/96.5 |
| 4,656,541 | 4/1987 | Rhyner et al. | 360/93 |
| 4,673,995 | 6/1987 | Spiegelstein | 360/93 |
| 4,807,067 | 2/1989 | Spiegelstein | 360/93 |
| 4,984,111 | 1/1991 | Rudi | 360/93 |
| 5,025,334 | 6/1991 | Perona et al. | 360/96.5 |
| 5,109,308 | 4/1992 | Kukreja et al. | 360/96.5 |

FOREIGN PATENT DOCUMENTS

| | | |
|---|---|---|
| 0147163 | 7/1985 | European Pat. Off. |
| 0339687 | 11/1989 | European Pat. Off. |
| 58-64663 | 4/1983 | Japan |
| 62-209761 | 9/1987 | Japan |

*Primary Examiner*—Stuart S. Levy
*Assistant Examiner*—David D. Davis
*Attorney, Agent, or Firm*—Hill, Steadman & Simpson

[57] ABSTRACT

A housing of a tape drive is adapted for sideways loading of a cartridge. The cartridge is loaded such that three reference points defining a fixed plane within the housing engages the cartridge in a fixed orientation with respect to a head within the drive. The cartridge is canted after the cartridge is engaged at a first one of the three reference points so as to fixedly engage the cartridge at each of the three reference points.

6 Claims, 1 Drawing Sheet

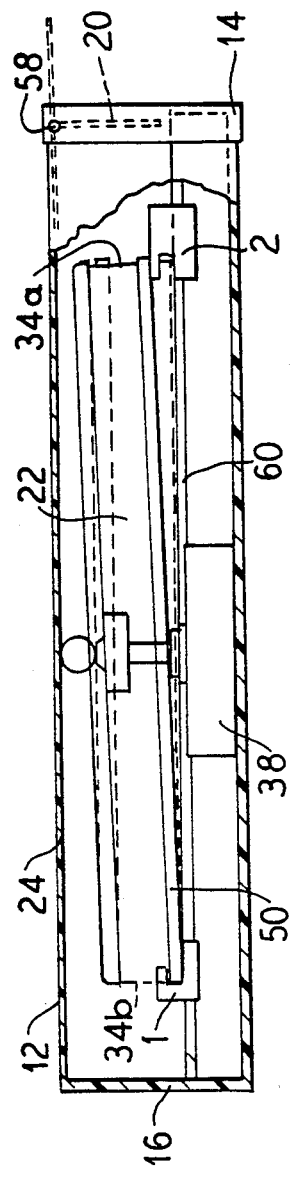
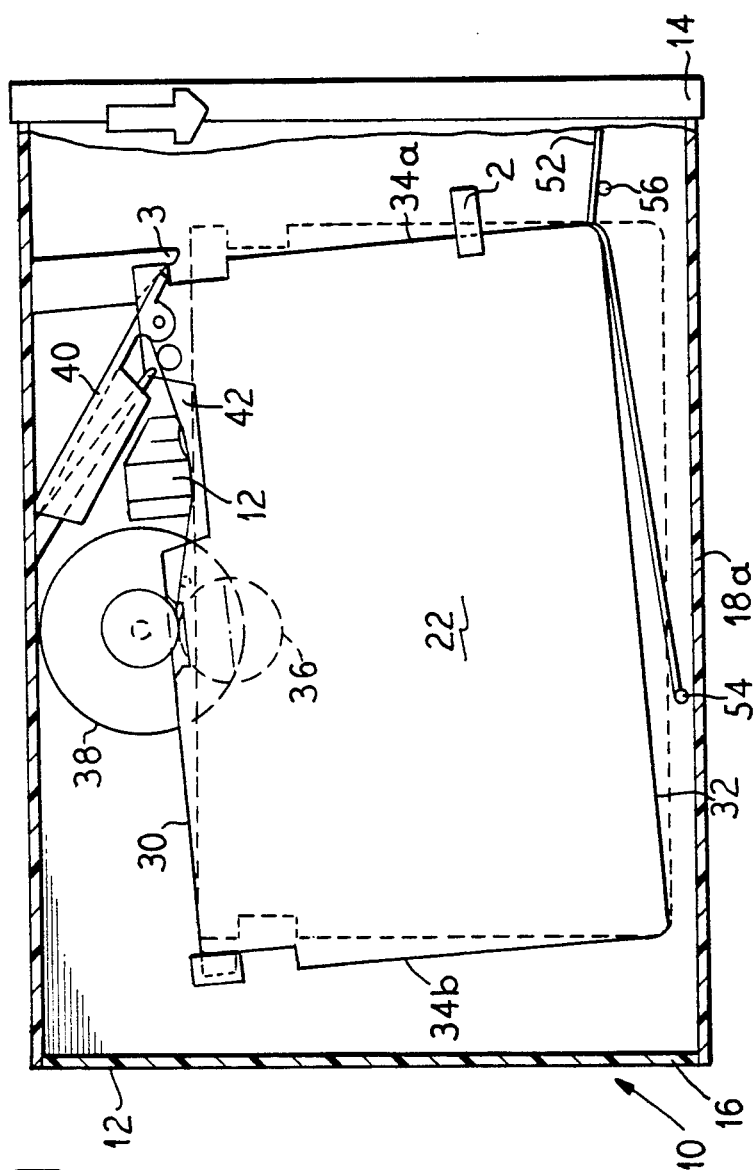

THREE POINT REFERENCE SYSTEM FOR A CARTRIDGE IN A TAPE DRIVE

BACKGROUND OF THE INVENTION

The present invention generally relates to digital magnetic tape drives and more particularly concerns the loading of a tape cartridge in a tape drive in accordance with ANSI/ECMA standards.

It is important in high capacity products, such as magnetic tape cartridges, that when the cartridge is loaded sideways into the tape drive that it be fixed in position. The fixed positioning provides the basis for accuracy and stability of the position of the magnetic head relative to the magnetic tape.

Prior art end-loading drives are known in which the magnetic head and tape drive motor are shifted into engagement after the cartridge is loaded in order to actuate the drive. This shifting is required since normal end-loading does not permit engagement of the components with the tape cartridge. This requires expensive and complex support mechanisms to provide accuracy for the engagement of the head and the motor with respect to the tape cartridge.

SUMMARY OF THE INVENTION

In the present invention, three fixed references are included within the tape drive such that when a 5¼ inch cartridge is inserted into the drive, the three fixed references are implemented to guide the cartridge into place without the need to shift the magnetic head and the drive motor to engage the cartridge.

The present invention, therefore, allows for the sideways insertion of a tape cartridge in a straight manner until a reference edge at the base of the cartridge goes under a first reference point at a corner end point of the drive. The cartridge slides over a second reference point as it enters the drive holding the cartridge above the base of the drive until it completely passes the second reference point. Once the second reference point is passed, the cartridge falls to the base allowing the cartridge to slide under the first reference point. The front of the cartridge is then canted such that the front corner of the tape cartridge slides under the second reference point as well as under a third reference point located at the opposite front corner from the second reference point. The three reference points define a plane in which the tape cartridge is locked. The plane is at a precise orientation with respect to the magnetic head such that movement of the head is not required for engagement with the tape cartridge.

BRIEF DESCRIPTION OF THE DRAWINGS

FIG. 1 is a top plan view of a cartridge tape drive with portions removed to reveal details of the inner components of the drive; and FIG. 2 is a cross-sectional view showing the tape cartridge prior to complete engagement in the drive.

DETAILED DESCRIPTION OF THE PREFERRED EMBODIMENTS

In FIGS. 1 and 2, a top and a cross-sectional view are respectively shown of a digital magnetic tape drive adapted for use with a conventional digital magnetic tape cartridge. The tape drive 10 has a housing 12 with a front wall 14, a back wall 16 and two opposing side walls 18a and 18b extending between the front wall 14 and the back wall 16. Attached to the front wall is a spring biased door 20 such that when the door 20 is opened the front wall 14 permits sideways loading of the cartridge 22 into the housing 12.

The housing 12 has a top cover 24 and a bottom cover 26 as shown in FIG. 2 such that when the cartridge 22 is loaded into the drive 10, all of the components of the drive and the cartridge 22 itself are encased within the housing 12. The cartridge 22 has a generally flat rectangular body with a front edge 30 which faces the magnetic head 12 once the cartridge 22 is loaded. A rear edge 32 and two ends 34a and 34b make up the other sides of the rectangular body of the cartridge 22. An opening 36 is provided near the front edge 30 of the cartridge 22 allowing access to a tape drive capstan 38. The capstan 38 regulates the speed of the tape in the drive 10 as is well known in the art.

A dust cover 40 is normally in a closed position covering an opening 42 to a tape 44 of the cartridge 22 when the cartridge 22 is not being used, generally when the cartridge 22 is outside of the housing 12. The dust cover 40 is pivotally mounted such that the dust cover 40 is forced into an open position when the cartridge 22 is loaded into the drive 10.

The cartridge 22 can be loaded end-wise with end 34b entering the housing 12 through the front wall 14 such that the front edge 30 of the cartridge 22 faces the magnetic head 12.

The loading path of the cartridge 22 is defined by three reference points 1, 2 and 3 as well as the other components of the drive 10. When the cartridge 22 is loaded, the cartridge 22 is inserted into the loading path through the front wall 14 of the housing 12. The reference point 2 is positioned such that the cartridge 22 can be slid into the housing above each of the reference points 1, 2 and 3.

The reference points 1, 2 and 3 are substantially configured in the form of a hook or clip. The shape of the reference points 1, 2 and 3 is such that when the cartridge 22 is inserted into the drive, a lower plate 50 (as shown in FIG. 2) engages with each reference point 1, 2 and 3 in sequential order, respectively.

The cartridge 22, therefore, can be inserted over reference points 2 and 3 and slid into the housing 12 until the lower plate 50 is fixedly engaged at reference point 1. Once the cartridge 22 is inserted to this point, the cartridge 22 is laying flat against the base of the drive. At this point, the cartridge 22 is canted using lever 52 such that the cartridge 22 can be slid into engagement at reference points 2 and 3.

The cartridge 22, therefore, can be locked in an engaged position defined by the reference points 1, 2 and 3 within the housing 12 of the tape drive 10. The reference points 1, 2 and 3 define a plane which is fixed with respect to the magnetic head 12 of the tape drive 10.

The magnetic head 12 is mounted along the loading path of travel for the cartridge 10 and can be moved in a direction normal to the fixed plane defined by reference points 1, 2 and 3 as is well known in the art. Furthermore, when the lever 52 cants the tape cartridge 22 into position, the dust cover 40 protecting the tape 44 is forced into an open position for the magnetic head 12 to be positioned proximate the tape 44.

The lever 52 is mounted at the base of the drive housing at a pivot point 54. After the lever 52 cants the cartridge 22, the lever 52 rests at a projection point 56 mounted at the base of the drive housing 12 such that the lever 52 provides an additional mechanism to ensure engagement of the cartridge 22 within the housing 12.

The spring-biased door 20 is mounted along the front wall 14 of the drive housing 12 at a second pivot point 58 to provide access for the cartridge 22 upon insertion of the cartridge 22 through the front wall 14.

At the point in which the cartridge 22 is fixedly engaged by each of the three reference points 1, 2 and 3, the drive 10 can perform operations on the tape 44 of the cartridge 22 as are well known in the art.

Although various minor changes and modifications might be proposed by those skilled in the art, it will be understood that I wish to include within the claims of the patent warranted hereon all such changes and modifications as reasonably come within my contribution to the art.

I claim as my invention:

1. A system for locating a cartridge into a housing of a drive, said cartridge containing a tape rotating about two spools within said cartridge, said tape moving between said spools along the length of an end of said cartridge, comprising:
   means for accessing an opening of said housing with said cartridge;
   means for receiving said cartridge in said housing such that said means for accessing accepts said cartridge in a predetermined orientation with respect to components within said housing, said predetermined orientation being a direction parallel to said length;
   means for initially guiding said cartridge to a first point inside said housing disposed at a fixed location to engage a leading corner of said cartridge when said cartridge is completely inserted in said housing; and
   means for subsequently shifting said cartridge in a direction substantially perpendicular to said direction said cartridge was received in said means for receiving, said means for shifting engaging said cartridge at a second point and at a third point after said cartridge is engaged at said first point, said first, second and third points defining a plane within said housing and comprising means for immovably holding said cartridge in said plane with said cartridge locked in said plane by said first, second and third points.

2. The system of claim 1 further comprising:
   a head within said housing for performing operations on said cartridge, said head being fixed in a known position with respect to said plane.

3. The system of claim 1 further comprising:
   means for holding said means for shifting after said cartridge has been shifted in said drive.

4. The system of claim 1 wherein said second point acts as a guide above which said cartridge enters said housing.

5. The system of claim 1 wherein said cartridge comprises:
   a lower plate which engages at each of said points, said lower plate being substantially the same two-dimensional shape as said cartridge.

6. The system of claim 1 wherein said cartridge further comprises:
   a door exposing a tape after insertion of said cartridge and during engagement of said cartridge at each of said points.

* * * * *